US006289141B1

(12) United States Patent
Roseman

(10) Patent No.: US 6,289,141 B1
(45) Date of Patent: Sep. 11, 2001

(54) APPARATUS FOR AUTHENTICATING PRODUCTS AND AUTHORIZING PROCESSES USING THE MAGNETIC PROPERTIES OF A MARKER

(76) Inventor: Morton F. Roseman, 178 Hunington Park Drive, Thornhill, Ontario (CA), L3T 7J8

(*) Notice: Subject to any disclaimer, the term of this patent is extended or adjusted under 35 U.S.C. 154(b) by 0 days.

(21) Appl. No.: 09/229,757

(22) Filed: Jan. 14, 1999

Related U.S. Application Data

(63) Continuation-in-part of application No. 09/198,280, filed on Nov. 24, 1998.
(60) Provisional application No. 60/071,567, filed on Jan. 15, 1998.

(51) Int. Cl.[7] ................................ G06K 7/08; G06K 9/20
(52) U.S. Cl. ........................ 382/320; 340/572.6; 382/135
(58) Field of Search .................................... 382/100, 112, 382/135, 137, 138, 139, 203, 101, 218, 320; 194/210; 209/534–535; 235/375, 449; 283/72; 340/572.2, 572.1, 572.4, 572.5, 572.6, 572.7

(56) References Cited

U.S. PATENT DOCUMENTS 4,490,846 * 12/1984 Ishida et al. ......................... 382/135
5,717,381 2/1998 Jagielinski et al. .
5,729,202 3/1998 Klaehn .
6,057,756 * 5/2000 Engellenner ......................... 340/505
6,128,402 * 10/2000 Jones et al. .......................... 382/135

* cited by examiner

*Primary Examiner*—Jayanti K. Patel
(74) *Attorney, Agent, or Firm*—Shoemaker and Mattare, LTD

(57) ABSTRACT

This invention provides a system that utilizes the magnetic properties of specific materials to provide an authentication and/or authorization function. The system consists of two parts. The first is a marker that contains a magnetic material with spectral magnetic properties and is attached to the item that is to be authenticated or is to be part of a subsequent information transfer process requiring authorization. The second is a reader. The reader contains a transmitter that generates the electromagnetic search field and energizes the magnetic material and a receiver that analyzes the signal produced by the resulting interaction with the magnetic material and gives a go/no go decision based upon a match with stored information. The reader employs a feedback control system to stabilize the measurement environment, thereby producing accurate, high quality results. The go/no go signal in itself can be used as the authentication signal and can also be used to energize an actuator for the purpose of automatically authorizing a process such as photocopying, sending a fax, data copying and data communication.

19 Claims, 2 Drawing Sheets

APPARATUS FOR AUTHENTICATING PRODUCTS AND AUTHORIZING PROCESSES USING THE MAGNETIC PROPERTIES OF A MARKER

CROSS-REFERENCE TO RELATED APPLICATION

This is a continuation-in-part of U.S. patent application Ser. No. 09/198,280, filed on Nov. 24, 1998, in the name of Morton F. Roseman and also claims benefit of Provisional application Ser. No. 60/071,567 filed Jan. 15, 1998.

BACKGROUND OF THE INVENTION

Many techniques are available to authenticate a product, that is to verify its legitimacy as compared to copies. The list of technologies applied to this problem is very long and includes many kinds of complex printing with overt or covert information, holograms, embedded materials and chemicals in trace amounts, magnetic additives, etc. All employ a specially manufactured label or tag that is attached permanently to the true product. Verification of the authenticity of the label or tag also verifies the authenticity of the product. The advantages of these techniques are that they provide unique, difficult to copy ways of differentiating real products from counterfeit ones.

Unfortunately, current authentication technologies are not without weaknesses. Usually, if cost is not a consideration, they can be copied to some degree. In addition, since many techniques rely only on visual inspection for verification, human error becomes a significant consideration. Finally, some methods rely on specialized equipment for verification and may be too expensive, cumbersome or slow to be effective in many situations. Currently, standardization is neither possible nor likely.

What is needed in an authentication technology is one that: 1) gives authentication information that can be detected swiftly an clearly in a quantitative manner; 2) is very difficult to copy; 3) can migrate easily to more sophisticated, more difficult to defeat levels of complexity; and 4) is compatible with existing methods of marking or labelling goods.

A technology that partially succeeds in meeting the above criteria is the "magentics" technology. It operates by searching for the presence of ferromagnetic material attached to the product that is to be authenticated. It analyzes the magnetic signature of the ferromagnetic material, focusing on specific and unique magnetic properties. A number of patents have been issued in this area for applications in authentication and other functions. Unfortunately, this approach has a major weakness in that uncontrollable variations can occur in the results of this measurement due to geometrical factors, thus affecting its accuracy and making it potentially unreliable.

A proper authentication system has many uses. It will provide a method of verifying the authenticity of a product in the field. It is useful in establishing a distinction between real and counterfeit products for legal purposes. When coupled to an actuator, it can be used to control document duplication and other information copying related processes such as photocopying, faxing and data transmission. For example, the unauthorized photocopying of a document may be blocked by adding an authentication reader to a photocopier.

SUMMARY OF THE INVENTION

This invention overcomes many of the problems listed previously and meets the criteria put forward for an improved authentication system. Like all currently available solutions, it depends upon the addition of a unique material or marker to an article in order to confirm its authenticity. However, it is superior to competing technologies in that it gives quantifiable, objective results and offers a means of simply and easily authenticating the marker. It does this by combining a feedback control system with a "magnetics" measuring system, resulting in precise determination of the characteristics of the marker. The usefulness of this invention is further enhanced by the fact that it is applicable to a wide variety of products, such as currency, documents, clothing, videos, CD's, toys, perfumes, etc., Finally, it is easily adapted to the problem of controlling the unauthorized duplication of documents and magnetic storage media.

The physical basis for this invention is described briefly below. When a magnetic material is introduced into a magnetic field, the magnetic flux will concentrate preferentially in the magnetic material because of its higher permeability relative to air. The degree of concentration of the flux is dependent upon the permeability of the magnetic material and its geometry.

When this ferromagnetic material is introduced into a time varying magnetic field, a more complex process occurs. Because the permeability of the magnetic material is not a constant, but changes as the external field changes, the spatial distribution of the flux changes in a unique way. In fact, the characteristics of the magnetic material. This change can be measured and is the basis for the hysteresis curve for magnetic materials.

The change in the spatial distribution of the flux is greater for larger values of permeability than for smaller values. In addition, it is also governed by the characteristics of the time varying external field, the shape and size of the magnetic material itself and the orientation of this material with respect to the external field. By controlling all other variables and using well known techniques to measure the time change in the spatial flux distribution, it is possible to uniquely recognize the magnetic material causing the change.

The invention based upon this physical principle has two essential components, a marker and a reader. The marker is optimally designed to have high permeability and low coercivity, so that it can interact strongly with the time varying electromagnetic search field and create an easily detectable and predictable change in the spatial flux distribution. The reader emits the electromagnetic search field that creates the flux which is then changed in some manner when the marker is introduced. It also measures and analyzes the resultant change in flux, using standard signal analysis techniques. The result is a set of parameters, that are then compared to a reference set of values stored in the detecting electronics. If there is a match to within the required degree, the article is genuine. The set of parameters used as the defining set is typically a subset of all the available parameters and is chosen to optimize the measurement process. It may vary depending upon the properties of the magnetic materials and the measurement techniques used.

In practice, there is a change in some of the parameters that are used to characterize the magnetic material due to the orientation and position of that material in the magnetic field. This variation will occur even though there is no change to the field or the magnetic properties of the magnetic material itself and it will affect the usefulness of the measurement in an authentication function. This problem is overcome in this invention by incorporating a feedback control system into the reader to maintain a constant reading environment (i.e. to stabilize the measurement).

A magnetic material will create a signal consistent with its magnetic properties. Given that the geometry of the measurement system and the characteristics of the stimulating field (such as the frequency and shape of the waveform and the strength of the field that is created) can be kept constant, the signal will uniquely represent the magnetic properties of the material causing it.

The magnetic properties of a material are a function of the component chemical elements, the method of manufacture, the various additional processes such as heat treatment that can be used on the magnetic material and its magnetic history. Therefore, magnetic properties can be controlled both at the time of manufacture and after.

The magnetic properties of materials are given by the B-H or hysteresis curve. From this curve, parameters such as permeability at different points of the curve, saturation and coercivity are taken. The hysteresis curve is also defined for a given frequency of stimulus or H field and will vary in shape as the frequency is changed. Consequently, these parameters take different values as the frequency changes. This leads to the availability of many possible parameters which can be used to distinguish between materials with different magnetic properties and to an almost unlimited number of materials with distinct magnetic properties. It can be reasoned that it would be difficult to find two magnetic materials from different sources that will have all possible properties identical at all frequencies. Therefore, operating in this invention, a material created with special properties will give a signal that is effectively distinct from all other magnetic materials.

A preferred marker in this invention is one which contains a material of low or very low coercivity and high permeability. While this property typically applies to ferromagnetic metals and alloys, it can also include any other materials, such as organic compounds or plastic and rubber compounds with appropriate additives, that possess the requisite magnetic properties. Low coercivity materials are typically defined as those with coercivities of less than 10 A/cm. High permeability materials typically have a relative permeability of 100,000 or more.

Although magnetic materials of medium or high coercivity may be used, low coercivity materials are preferred because they require low intensity stimulating fields. Similarly, for best results, high relative permeabilities are preferred, although materials with lower relative permeabilities will also generate signals, albeit of a lower magnitude, all other factors being equal.

Some examples of materials suitable for use as markers are ferrous alloys, which include combinations of elements such as, but not exclusively, iron, nickel, cobalt, etc. They may have a crystalline microstructure as with the alloys made by Allied Amorphous Products and Vacuumschmelze. They may be manufactured by techniques such as rapid solidification technology, vacuum deposition, sputtering, rolling, etc. into sheets, ribbons, fibres, etc. They may be heat treated with or without magnetic fields to decrease coercivity and improve performance.

The foregoing is not an exhaustive list, but merely gives a few important examples of materials that have been shown to work in this application.

Although the simplest marker is one composed of a single type of magnetic material, it is possible to use a combination of materials, each with different magnetic properties. The properties that can be used to obtain this difference include coercivity, saturation, frequency response of the magnetic properties, permeabilities, shape of B-H loop, values of the foregoing at different frequencies, etc.). This construction gives a more complex signal, which is more difficult to copy and results in a more effective deterrent.

When a marker having the preferred magnetic properties is placed in an electromagnetic search field such that the polarity of the field along one of its dimensions reverses periodically, the signal as described earlier is generated. As the field within the marker material goes from a maximum in one direction, through zero, to a maximum in the other direction and back, the marker may completely or partially saturate first in one direction and then in the other. This results in a change in the permeability of the magnetic material in the marker and consequently in a change to the spatial flux distribution. This change in the distribution of the flux can be detected by an appropriately designed receiving antenna and appears as a pulse in the time domain. The shape and size of this pulse depend upon the shape and frequency of the electromagnetic field, the hysteresis curve of the marker material at that frequency, the physical characteristics of the marker and the geometrical factors of the transmitting and receiving antennas such as size, shape, number of turns and relative orientation in space.

For most authentication systems, all these system variables are fixed at the time of the design of the system. The one exception is the orientation of the marker with respect to the electromagnetic field, which is a function of the manner in which the measurement is conducted and the placement of the marker within the object to be authenticated. In this invention1 a feedback control system is added to monitor the quantity of flux within the marker and maintain it at predetermined levels by increasing or decreasing the strength of the transmitted electromagnetic field. In this way, the marker always sees an electromagnetic field with the same properties, and hence responds in the same predictable manner.

In one useful arrangement, the transmitting section of the reader generates a sinusoidally varying field (although other shapes such as rectangular, triangular and combination shapes are possible). Any frequency for which the magnetic material gives a signal can be used, although typically values from 100 Hz. to 50,000 Hz. are preferred. The field is created by a transmitting antenna made up of a loop of one or more turns of wire. Various types of antenna shapes—square, circular, FIG. 8—would give acceptable results.

The transmitted field itself may be a modulated field, either in amplitude or in frequency, or contain a number of discrete frequency components added together.

The receiving antenna, made up of one or more loops of wire (possible shapes are square or circular loop, FIG. 8, triple loop construction, etc.) that is located coplanar with the transmitting antenna, measures the flux generated by the transmitter and converts changes in the flux into an electrical signal. The transmitting and receiving antenna need not be coplanar so long as the receiving antenna intercepts a sufficient amount of the transmitted flux.

The marker is constructed by selecting the appropriate magnetic material in the proper amount and shape suitable for the application. Shapes that have been found to work well are a square and a rectangle, although these are not the only ones possible. The ratio of length to width or aspect ratio is a factor in assessing the performance of the marker, as a high aspect ratio results in easier saturation and a signal with higher harmonics. If fibres are to be used, the density of the fibres must also be considered. Typical sizes of marker found to be of use range from 1–25 millimeters for the minimum dimension and 10–100 millimeters for the maximum dimension.

The information contained in the signal may be analyzed in the frequency of the time domain. In the frequency domain, one analytic technique that has been used is complex Fourier analysis, which gives amplitude and phase information for the harmonics of the signal. In the time domain, correlation and comparisons can be made. The reader maintains reference values for the parameters that best represent the unique properties of the marker being used. When the signal is decoded into its constituent parameters, these can be compared to the reference values to give a go/no go signal.

In one possible scheme, the detection algorithm would look at harmonic components of the marker signal when stimulated by a single frequency. In another, the stimulus field could be composed of multiple frequencies to give a more complex and difficult to copy response.

A simple, effective method of stabilizing the measurement is to monitor the flux in the marker by means of one (or more) of the Fourier harmonic components (third, fifth, etc.) of the signal and adjust the amplitude of the transmitted field to keep the amplitude of the harmonic component at a constant level.

The applications for this invention can be greatly broadened by adding an actuator to the output of the reader. In this case, the marker can be used to enable or disable a process. In one example, copying of documents may be controlled by this invention. A photocopies may be designed to scan for the presence of the magnetic material within or on a document. If the material is found to be present, the copier can be made to disconnect. This provides a level of anticopying security for documents. A facsimile machine may be provided with similar capability. In another application, software on disks or magnetic tapes may be scanned similarly for the presence of the appropriate magnetic material. The disk reader may then either permit or inhibit the input of the data.

More particularly, this invention provides a method of verifying the authenticity of a candidate item which resembles any one of a multiplicity of such items, all authentic, said method comprising the steps:

a) providing a marker on each authentic item in said multiplicity, all markers having substantially the same magnetic properties, b) generating a magnetic field which varies with time, c) providing a receiving antenna which intercepts said field so as to generate an electronic signal, the receiving antenna having loops connected such that a) if the loops are placed in a field with no marker present, the signals in the loops cancel each other, but b) if a marker is present in the field, the spatial distribution of flux is changed and a differential signal is generated in the receiving antenna, d) placing the candidate item in the field such that, if the candidate item contains a marker, the marker will interact with the field so as to alter said electronic signal, e) analyzing the altered electronic signal in at least one of: 1) the time domain, and 2) the frequency domain, so as to arrive at a parameter representing a unique property of the marker being used, f) comparing said parameter to stored reference values for an authentic item, and g) on the basis of such analysis determining whether the candidate item is authentic.

Further, this invention provides an apparatus for verifying the authenticity of a candidate item which resembles any one of a multiplicity of such items, all authentic, each authentic item having a marker, all markers having substantially the same magnetic properties, said apparatus comprising:

a) generating means for generating a magnetic field which varies with time, b) a receiving antenna which intercepts said field so as to generate an electronic signal, the receiving antenna having loops connected such that a) if the loops are placed in a field with no marker present, the signals in the loops cancel each other, but b) if a marker is present in the field, the spatial distribution of flux is changed and a differential signal is generated in the receiving antenna, such that, if the candidate item contains a marker and is placed in the field, the marker will interact with the field so as to alter said electronic signal.

c) analyzing means for analyzing the altered electronic signal in at least one of: 1) the time domain, and 2) the frequency domain, so as to arrive at a parameter representing a unique property of the marker being used, d) storage means for storing reference values for said parameter in an authentic item, and comparison means for comparing the arrived-at parameter to values stored in said storage means, thus allowing a determination of the authenticity of the candidate item.

BRIEF DESCRIPTION OF THE DRAWINGS

One embodiment of this invention is illustrated in the accompanying drawings, in which like numerals denote like parts throughout the several views, and in which.

DETAILED DESCRIPTION OF THE PREFERRED EMBODIMENTS

Figure 1:
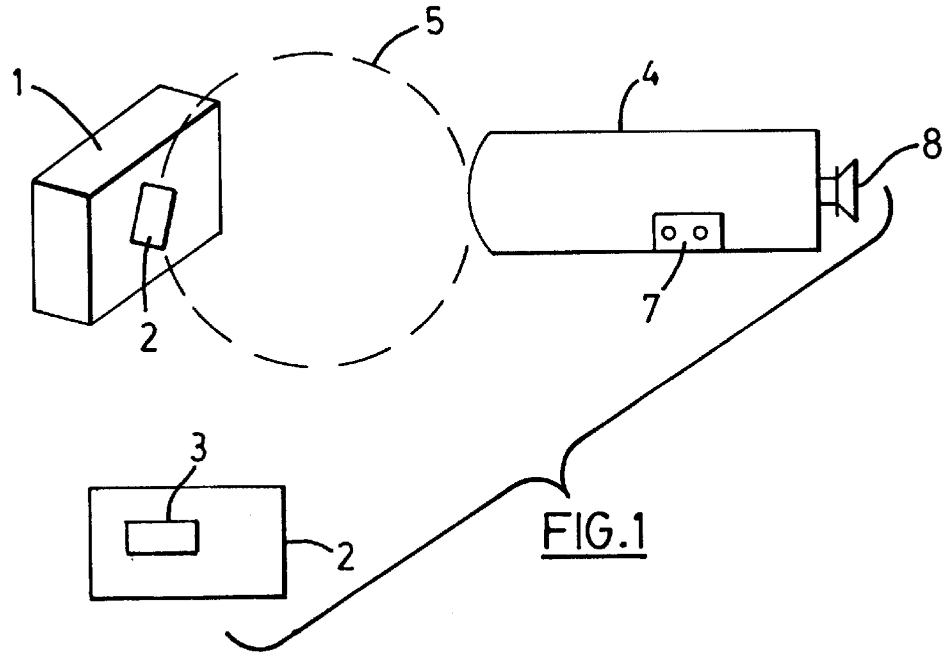
FIG. 1 is a diagram of the elements of the system.

FIG. 1 illustrates the essential components of the system. An article 1 has attached to or embedded within it a marker 2 consisting of one or more high permeability, low coercivity material 3, either crystalline or amorphous. This marker is specially manufactured to create a particular response when energized in a certain manner. A reader 4 creates the energizing signal, an electromagnetic search field 5, and is then able to distinguish the particular response created by the marker 2. If this happens, an authentication signal 8 is generated and/or an actuator 7 is enabled or disabled. The reader has an additional feature allowing it to a) dynamically analyze the response, b) determine whether the electromagnetic search field 5 as seen by the marker 2 has changed, and c) make adjustments to compensate.

Figure 3:
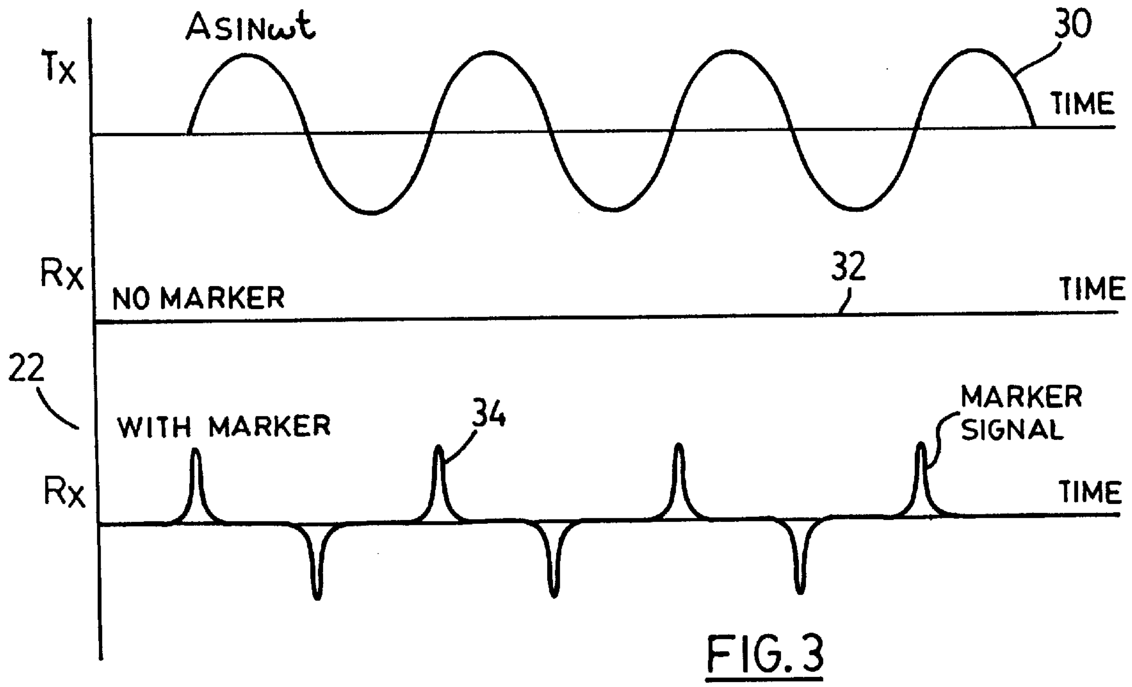
FIG. 3 gives diagrams of the important waveforms.
Figure 2:
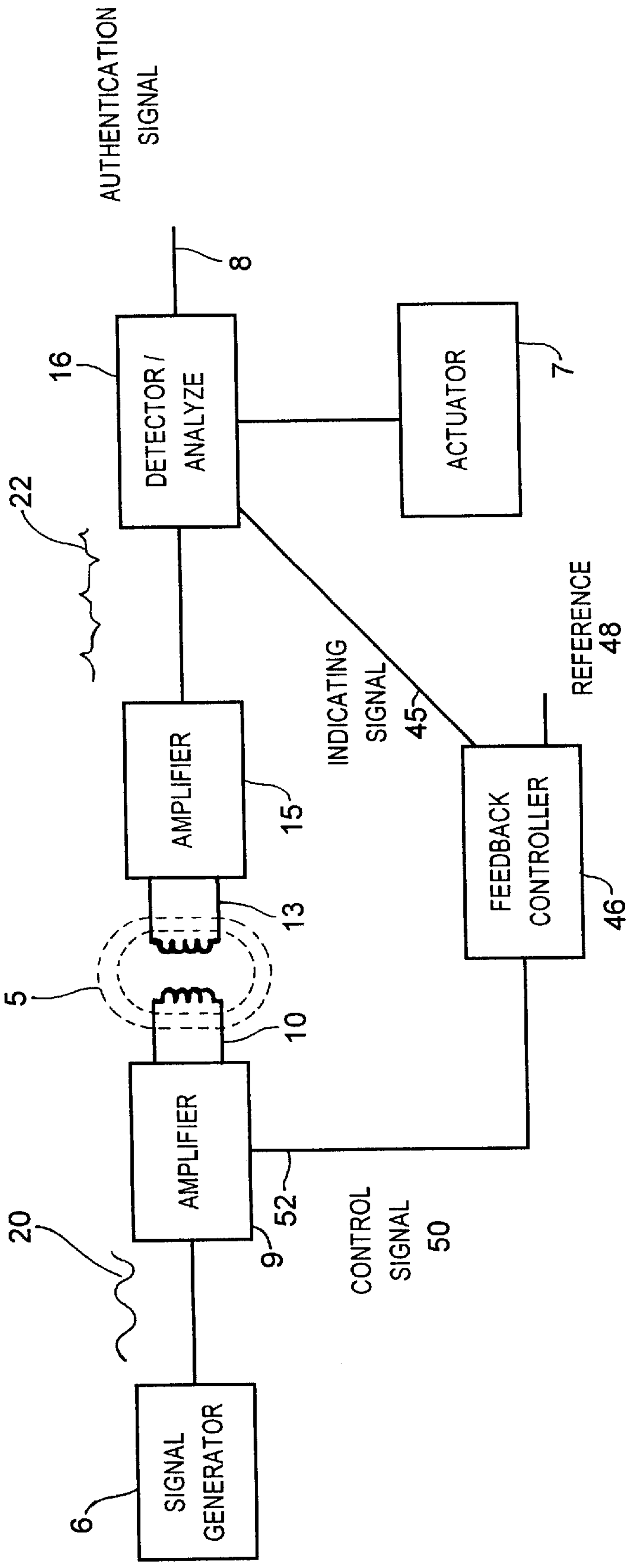
FIG. 2 is a block diagram of the components of the reader.

FIGS. 2 and 3 illustrate in greater detail the method by which the authentication process occurs. FIG. 2 is a functional block diagram of the component part of the system. FIG. 3 illustrates the waveforms that are relevant to an understanding of the functions performed by the system.

The reader 4 is composed of several functional modules. The transmitting section consists of a signal generator 6 which creates a sinusoidal waveform 20 at a fixed frequency of, one of a number of possible waveforms and possible frequencies or combinations thereof that are suitable for this application. This waveform 20 is amplified by an amplifier 9 to drive a transmitting antenna 10, which creates the electromagnetic search field 5. The transmitting antenna 10 in its simplest from is a loop of one or more turns of conducting wire.

The electromagnetic search field 5 is intercepted by a receiving antenna 13 in the shape of FIG. 8, which is coplanar to the transmitting antenna 10. The receiving antenna 13 generates a voltage when it intercepts the flux, due to the time varying electromagnetic field 5. This voltage contains information about the magnetic properties of the magnetic material 3.

The receiving antenna 13 is designed so that the two loops that make the FIG. 8 are wound in opposite directions and when placed in a unidirectional external field, signals induced in it cancel. The FIG. 8 shape need not be symmetrical. It is merely one means, although not the only one, to arrive at signal cancellation. Therefore, if the flux through each half of the FIG. 8 receiving antenna 13 is equal, no output voltage is generated by it. The output of the receiving antenna 13 is then amplified in an amplifier 15. Subsequently, detection electronics 16 analyzes the signal 22 generated by the receiving antenna 13 and uses the information gathered to decide upon the authenticity of the article 1. If the marker 2 is found to be authentic, the candidate article 1 is authenticated and the authentication notification 8 is given or the actuator 7 is energized.

At the same time, the detection electronics 16 analyzes the signal 22 generated by the receiving antenna 13 to provide a indicating signal 45 that represents a particular component, such as an harmonic, of the signal 22. This indicating signal 45 is applied to a feedback controller 46. The feedback controller 46 compares this signal 45 to a reference 48 stored in memory. When any difference is detected, the feedback controller applies the necessary control signal 50 to the control input 52 of the amplifier 9 to bring the system back into stable operation.

Refer to FIG. 3. The presence of the marker 2 is determined in the following manner. The transmitting antenna 10 generates a field with a sinusoidal shape 30. When no magnetic material 3 is present, the flux flowing through the two loops of the receiving antenna 13 is in balance and the signal 32 at the output of the amplifier 15 is zero. When the marker 2 is introduced into the field 5, it changes the spatial flux distribution of flux passing through the receiving antenna 13 and a differential signal representing the change in flux distributions appears. This causes a corresponding change in the field detected by the receiving antenna 13 which looks like the pulse 34 in the time domain.

While a receiving antenna 13 in a FIG. 8 form is employed in this embodiment, electronic cancellation can also be employed after the receiving antenna 13 to null out the transmitted field 5, leaving behind only the marker signal 22.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. A method of verifying the authenticity of a candidate item which resembles any one of a multiplicity of such items, all authentic, said method comprising the steps:

a) providing a marker on each authentic item in said multiplicity, all markers having substantially the same magnetic properties, b) generating a magnetic field which varies with time, c) providing a receiving antenna which intercepts said fields so as to generate an electronic signal, the receiving antenna having loops connected such that a) if the loops are placed in a filed with no marker present, the signals in the loops cancel each other, but b) if a marker is present in the field, the spatial distribution of flux is changed and a differential signal is generated in the receiving antenna, d) placing the candidate item in the field such that, if the candidate item contains a marker, the marker will interact with the field so as to alter said electronic signal, e) analyzing the altered electronic signal in at least one of: 1) the time domain, sand 2) the frequency domain, so as to arrive at a parameter representing a unique property of the marker being used, f) comparing said parameter to stored reference values for an authentic item, and g) on the basis of such analysis determining whether the candidate item is authentic.

2. The method claimed in claim 1, in which the receiving antenna consists of loops wound oppositely to each other.

3. The method claimed in claim 1, in which the strength of the magnetic field generated under b) is continuously adjusted to maintain at least one parameter at a constant level.

4. The method claimed in claim 1, in which the electronic signal is analyzed in the frequency domain, said parameter being a selected harmonic, the amplitude of the generated field being continuously adjusted to keep the amplitude of the selected harmonic at a fixed value, thereby stabilizing both the selected harmonic and all other harmonics, the method further including measuring the ratio between the value of the selected harmonic and the value of another harmonic, and comparing said ratio to a stored reference value for the same harmonic ratio, whereby a substantial departure from the stored reference value for said ratio signals the likelihood that the candidate item is not authentic.

5. The method claimed in claim 4, in which, in the event that the candidate item is determined not to be authentic, such determination is utilized to disable or enable another process.

6. The method claimed in claim 5, in which all markers have substantially the same magnetic permeability.

7. The method claimed in claim 4, in which the relative permeability of the markers is at least 100,000.

8. The method claimed in claim 1, in which, in the event that the candidate item is determined not to be authentic, such determination is utilized to disable or enable another process.

9. An apparatus for verifying the authenticity of a candidate item which resembles any one of a multiplicity of such items, all authentic, each authentic item having a marker, all markers having substantially the same magnetic properties, said apparatus comprising:

a) generating means for generating a magnetic field which varies with time, b) a receiving antenna which intercepts said field so as to generate an electronic signal, the receiving antenna having loops connected such that a) if the loops are placed in a unidirectional field with no marker present, the signals in the loops cancel each other, but b) if a marker is present in the field, the spatial distribution of flux is changed and a differential signal is generated in the receiving antenna, such that, if the candidate item contains a marker and is placed in the field, the marker will interact with the field so as to alter said electronic signal, c) analyzing means for analyzing the altered electronic signal in at least one of: 1) the time domain, and 2) the frequency domain, so as to arrive at a parameter representing a unique property of the marker being used, d) storage means for storing reference values for said parameter in an authentic item, and e) comparison means for comparing the arrived at parameter to values stored in said storage means, thus allowing a determination of the authenticity of the candidate items.

10. The apparatus claimed in claim 9 in which, in the absence of the marker, said magnetic field varies substantially sinusoidally, and said electronic signal generated in said receiving antenna is a substantially sinusoidal voltage.

11. The apparatus claimed in claim 9, in which all markers have substantially the same magnetic permeability.

12. The apparatus claimed in claim 9, in which the generating means continuously adjusts the magnetic field to maintain the said parameter at a constant level.

13. The apparatus claimed in claim 9, in which the analyzing means analyzes the electronic signal in the frequency domain, said parameter being a selected harmonic, the generating means being adapted to continually adjust the amplitude of the generated field to keep the amplitude of the selected harmonic at a fixed value, thereby stabilizing both the selected harmonic and all other harmonics, the method further including measuring the ratio between the value of the selected harmonic and the value of another harmonic, and comparing said ratio to a stored reference value for the same harmonic ratio, whereby a substantial departure from the stored reference value for said ratio signals the likelihood that the candidate item is not authentic.

14. The apparatus claimed in claim 13, in which, in the event that the candidate item is determined not to be authentic, such determination is utilized to disable or enable another process.

15. The apparatus claimed in claim 13, in which all markers have substantially the same magnetic permeability.

16. The apparatus claimed in claim 9, in which, in the event that the candidate item is determined not to be authentic, such determination is utilized to disable or enable another process.

17. The apparatus claimed in claim 9, in which the said items are currency bills.

18. The apparatus claimed in claim 9, in which the said items are documents.

19. The apparatus claimed in claim 9, in which the relative permeability of the markers is at least 100,000.

* * * * *

UNITED STATES PATENT AND TRADEMARK OFFICE

CERTIFICATE OF CORRECTION

PATENT NO. : 6,289,141 B1
DATED : September 11, 2001
INVENTOR(S) : Roseman

It is certified that error appears in the above-identified patent and that said Letters Patent is hereby corrected as shown below:

Column 1,
Line 37, the word "an" after swiftly should be -- and --.

Column 2,
Lines 26 and 27, the sentence "In fact, the characteristics of the magnetic material." should read -- In fact, the characteristics of this flux change are determined in large part by the magnetic characteristics of the magnetic material. --.

Column 5,
Line 5, change the word "of" after "frequency" to -- or --.
Line 31, change "A photocopies" to -- A photocopier --.

Column 8,
Line 5, correct the word "filed" to -- field --.
Line 15, correct the word "sand" to -- and --.

Signed and Sealed this

Fifth Day of November, 2002

*Attest:*

JAMES E. ROGAN

*Attesting Officer*

*Director of the United States Patent and Trademark Office*